United States Patent

Saitou

(10) Patent No.: US 9,178,398 B2
(45) Date of Patent: Nov. 3, 2015

(54) STATOR OF ELECTRIC MOTOR

(71) Applicant: FANUC CORPORATION, Yamanashi (JP)

(72) Inventor: Tetsumaru Saitou, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 155 days.

(21) Appl. No.: 14/094,881

(22) Filed: Dec. 3, 2013

(65) Prior Publication Data
US 2014/0152141 A1 Jun. 5, 2014

(30) Foreign Application Priority Data

Dec. 4, 2012 (JP) .................................. 2012-265086

(51) Int. Cl.
H02K 9/22 (2006.01)
H02K 3/50 (2006.01)
H02K 1/18 (2006.01)

(52) U.S. Cl.
CPC .................. *H02K 3/50* (2013.01); *H02K 1/185* (2013.01); *H02K 9/22* (2013.01); *H02K 2213/03* (2013.01)

(58) Field of Classification Search
CPC ............ H02K 9/22; H02K 3/50; H02K 1/185
USPC .......................................................... 310/64
See application file for complete search history.

(56) References Cited

U.S. PATENT DOCUMENTS

| 2,961,555 | A | * | 11/1960 | Towne ............................. 310/43 |
| 6,583,532 | B2 | * | 6/2003 | Hein et al. ..................... 310/260 |
| 7,009,316 | B2 | | 3/2006 | Ueda et al. |
| 8,970,077 | B2 | * | 3/2015 | Murakami et al. ............... 310/64 |
| 2008/0223557 | A1 | * | 9/2008 | Fulton et al. ............. 165/104.33 |

FOREIGN PATENT DOCUMENTS

| JP | 3262716 B | 2/1998 |
| JP | 3775348 B | 5/2006 |
| JP | 2008178190 A | 7/2008 |
| JP | 201068699 A | 3/2010 |

OTHER PUBLICATIONS

Untranslated Office Action for Japanese Application No. 2012-265086, May 29, 2014, 2 pages.
English Machine Translation of Office Action for Japanese Application No. 2012-265086, May 29, 2014, 2 pages.

* cited by examiner

*Primary Examiner* — Dang Le
(74) *Attorney, Agent, or Firm* — Fredrikson & Byron, P.A.

(57) ABSTRACT

A stator (100) of an electric motor includes a coil (12), a stator core (10) which supports the coil, and covers (22a, 22b) which are attached to the stator core so as to surround coil ends (13a, 13b) of the coil, wherein the covers have outside diameters which are at least partially smaller than the outside diameters of the stator cores, the covers have coefficients of linear expansion which are larger than the coefficient of linear expansion of the stator core, and the covers expand due to heat whereby the covers closely contact the housing which is arranged around the stator.

14 Claims, 3 Drawing Sheets

STATOR OF ELECTRIC MOTOR

BACKGROUND OF THE INVENTION

1. Technical Field

The present invention relates to a stator of an electric motor. In particular, the present invention relates to a stator of an electric motor which has covers which cover coil ends which stick out from end faces of a stator core.

2. Description of the Related Art

In general, high output electric motors are being sought. However, to increase the output of electric motors, it is necessary to efficiently discharge the heat which is generated from the coil. For this reason, in the past, various electric motors have been proposed which efficiently discharge the heat which is generated from the coil to the outside.

Japanese Patent No. 3262716, Japanese Patent Publication No. 2008-178190, and Japanese Patent No. 3775348 disclose to insert a stator of an electric motor into a tube member and to fill an insulating resin with a high heat conductivity into the clearance between the stator and the tube member. In this case, however, the stator is increased in outside diameter by the amount of the tube member, so there is a possibility that the stator which is inserted into the tube member is not able to be placed in an existing housing.

Furthermore, Japanese Patent Publication No. 2010-68699 discloses a configuration where two covers surround the coil ends. In this case, the stator does not change in outside diameter, so the above-mentioned problem does not arise. Further, it is sufficient to prepare just covers, so the result is cheaper than with the case of using a tube member.

However, in Japanese Patent Publication No. 2010-68699, a material with a high heat conductivity is used to prepare the covers, so there is the problem that the covers more easily rise in temperature compared with the stator core.

Further, a stator is often fastened to a housing by shrink fitting. Therefore, if the stator is inserted into a heated housing etc, the covers are heated more rapidly than the stator core. As a result, sometimes the covers expand by heat and are tightly fit to the housing.

The present invention was made in consideration of such a situation and has as its object the provision of a stator of an electric motor which is provided with covers which are never tightly fit with the housing.

SUMMARY OF THE INVENTION

To achieve the above-mentioned object, according to a first aspect, there is provided a stator of an electric motor comprising a coil, a stator core which supports the coil, and covers which are attached to the stator core so as to surround coil ends of the coil which stick out from end faces of the stator core in the axial direction, wherein the covers have outside diameters which are at least partially smaller than an outside diameter of the stator core, the covers have coefficients of linear expansion which are larger than a coefficient of linear expansion of the stator core, and the covers expand by heat whereby the covers are made to closely contact a housing which is arranged around the stator.

According to a second aspect, there is provided the first aspect wherein cutaway parts are formed at outside edge parts of distal ends of the covers.

According to a third aspect, there is provided the first aspect wherein slanted parts which extend from proximal ends to distal ends of the covers are formed at outer surfaces of the covers.

According to a fourth aspect, there is provided the first aspect wherein curved parts are formed at outside edge parts of distal ends of the covers.

According to a fifth aspect, there is provided the first aspect wherein curved parts which extend from proximal ends to distal ends of the covers are formed at outer surfaces of the covers.

According to a sixth aspect, there is provided the first aspect wherein outer surfaces of the covers are formed with step parts and the step parts have outside diameters which are equal to the outside diameter of the stator core at proximal ends of the covers and which are smaller than the outside diameter of the stator core at distal ends of the covers.

According to a seventh aspect, there is provided the sixth aspect wherein outside edge parts of distal ends of the covers are formed with cutaway parts or curved parts.

These and other objects, features, and advantages of the present invention will become clearer from the detailed description of typical embodiments of the present invention which are shown in the attached drawings.

DETAILED DESCRIPTION

Below, embodiments of the present invention will be explained with reference to the attached drawings. In the following figures, similar members are assigned similar reference notations. To facilitate understanding, these figures are suitably changed in scale.

Figure 1:
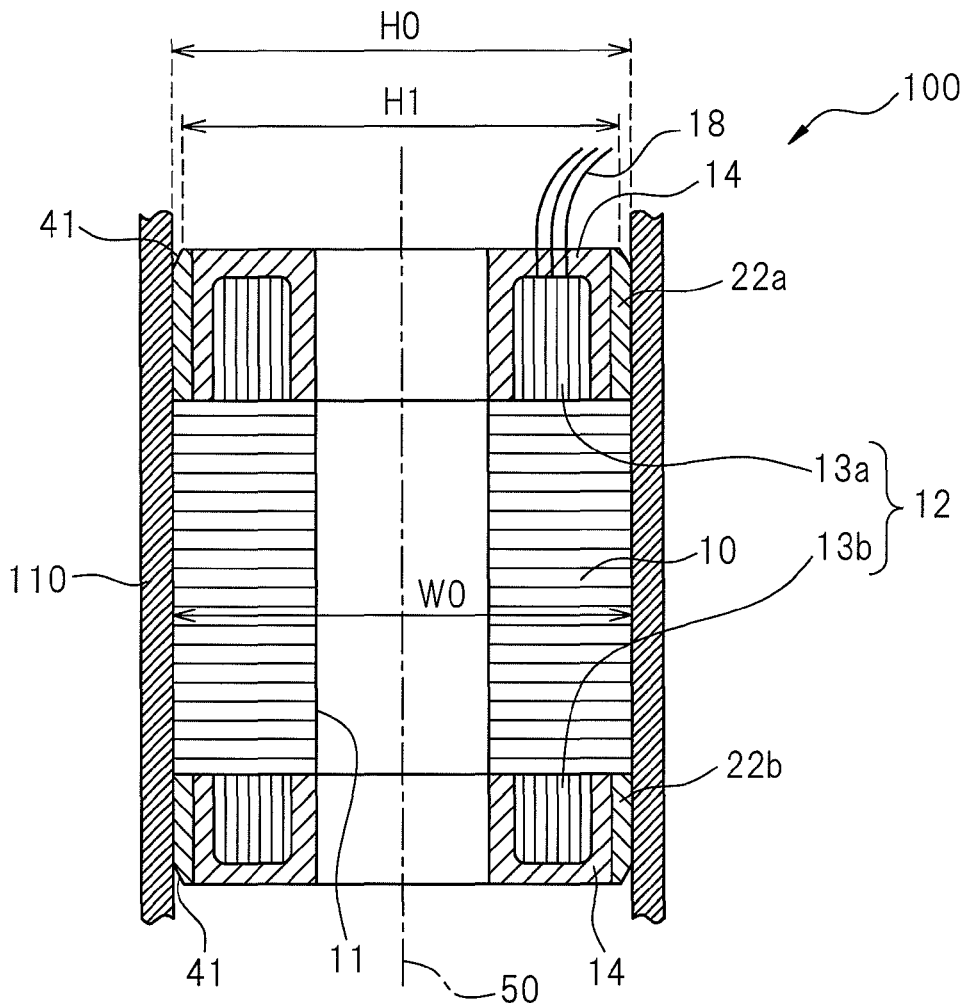
FIG. 1 is a cross-sectional view which shows the configuration of a stator of an electric motor according to the present invention.

FIG. 1 is a cross-sectional view which shows the configuration of a stator of an electric motor according to the present invention. As shown in FIG. 1, the stator 100 of the electric motor is provided with a stator core 10, a coil 12, mold resin 14, and end covers 22a, 22b. Further, the stator 100 is arranged inside of a housing 110 by shrink fitting etc.

The stator core 10 is a cylindrically shaped core and is produced by stacking ring-shaped magnetic steel sheets. At the inside of the stator core 10, a hollow hole 11 is formed. In this hollow hole 11, a fixture which is used when injecting the mold resin 14 (resin filler) or a rotor (not shown) of the electric motor is inserted.

The stator core 10 supports the coil 12. The end parts of the coil 12, constituted by the coil end parts 13a, 13b, stick out from the end faces of the stator core 10 in the axial direction to the outside. Further, as shown in FIG. 1, from the coil end part 13a, a lead wire 18 for supplying power to the coil 12 is led to the outside.

The end covers 22a, 22b in the present embodiment are substantially cylindrically shaped members and are formed from a high heat conductivity material, for example, a resin. As shown in FIG. 1, the end covers 22a, 22b are attached to the stator core 10 so as to cover the coil end parts 13a, 13b in the circumferential direction. Further, as can be seen from FIG. 1, the end covers 22a, 22b have maximum outside diameters H0 which are equal to the outside diameter W0 of the stator core 10.

The mold resin 14 is injected and filled into the spaces between the coil end parts 13a, 13b and the end covers 22a, 22b where it is solidified. The mold resin 14 and the end covers 22a, 22b are in close contact with the outer circumferential surface of the mold resin 14. For this reason, the heat which is generated from the heat coil end parts 13a, 13b is discharged through the mold resin 14 and the end covers 22a, 22b to the outside housing 110.

Figure 2A:
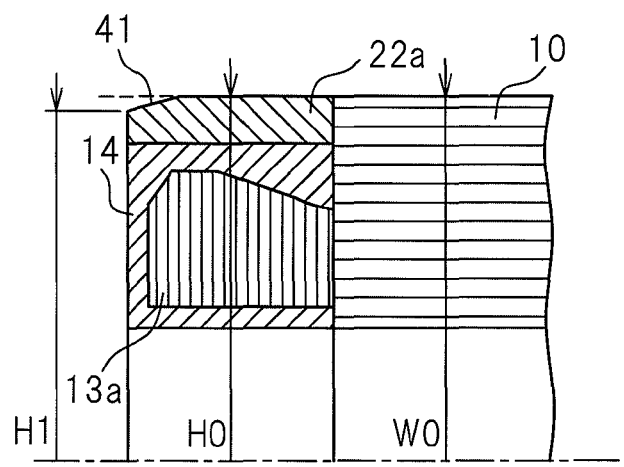
FIG. 2A is a first enlarged view of a coil end part which is shown in FIG. 1

FIG. 2A is a first enlarged view of a coil end part. In FIG. 2A, the one coil end part 13a is shown, but the same is true for the other coil end part 13b as well. Furthermore, for the purpose of simplification, in FIG. 2A, illustration of the housing 110 is omitted. The same is true for the later explained FIG. 2B to FIG. 4B.

As shown in FIG. 2A, at the outside edge part of the end cover 22a, a cutaway part 41 is formed. Therefore, at the distal ends of the end covers 22a, 22b, the distal end outside diameters H1 of the end covers 22a, 22b are smaller than the outside diameter W0 of the stator core 10. At the remaining parts of the end covers 22a, 22b where the cutaway parts 41 are not formed, the end covers 22a, 22b have maximum outside diameters H0 which are equal to the outside diameter W0 of the stator core 10.

In such a configuration, when placing the stator 100 inside the housing 110, slight clearances are formed between the distal ends of the end covers 22a, 22b and the housing. Further, the stator 100 is fastened to the housing 110 by shrink fitting. In the present invention, even if shrink fitting is used to fasten the stator 100 to the housing 110, there is a slight clearance present, so the end covers 22a, 22b can be kept from rapidly rising in temperature. For this reason, it becomes possible to prevent the covers from ending up being tightly fit against the housing in the middle of shrink fitting.

Further, if the housing reaches a certain temperature at the time of operation of the electric motor, the end covers 22a, 22b will expand by the heat and the end covers 22a, 22b will have distal end outside diameters H1 at the distal ends which are equal to the outside diameter W0 of the stator core. For this reason, the outer circumferential surfaces near the distal ends of the end covers 22a, 22b also closely contact the inner surfaces of the housing. Therefore, at the time of operation of the electric motor, the heat generating members constituted by the end covers 22a, 22b closely contact the heat removing part constituted by the housing 110. For this reason, at the time of operation of the electric motor, the heat from the end covers 22a, 22b can be efficiently conducted to the housing 110. In other words, in the present invention, it is possible to obtain a heat removal effect similar to the stator 100 of the prior art where the outside diameters of the end covers 22a, 22b and the outside diameter of the stator core 10 are equal across the entire end covers 22a, 22b.

In this regard, the end covers 22a, 22b have distal end outside diameters H1 which are determined by the following equation (1):

$$H1 = W0 \times \{1+\sigma 0(T-Tr)\}/\{1+\sigma 1(T-Tr)\} \quad (1)$$

In equation (1), $\sigma 0$ is the coefficient of linear expansion (1/° C.) of the material of the stator core 10, $\sigma 1$ is the coefficient of linear expansion (1/° C.) of the material of the end covers 22a, 22b, T is the temperature (° C.) of the housing 110 when the distal ends of the end covers 22a, 22b expand due to heat to be in close contact with the housing 110, and Tr is the temperature (° C.).

The coefficients of linear expansion $\sigma 0$, $\sigma 1$ are determined in accordance with the materials which are used. Therefore, in the present invention, if the temperature at which the housing 110 to which the stator 100 is arranged and the end covers 22a, 22b come into close contact is determined, the distal end outside diameters H1 can be calculated. This temperature T is found in advance by experiments etc. considering the coefficients of linear expansion $\sigma 0$, $\sigma 1$.

In the embodiment which is shown in FIG. 2A, the electrical steel sheets which form the stator core 10 have a coefficient of linear expansion $\sigma 0$ of about $11.2 \times 10^{-6}$ [1/° C.] and have an outside diameter of W0=about $\phi 180.0$ [mm]. The end covers 22a, 22b are for example formed from aluminum alloy and have coefficients of linear expansion $\sigma 1$ of $23 \times 10^{-6}$ [1/° C.]. Furthermore, the housing temperature Tr at the time of not operating is set to 25° C. while the temperature T at the time when the distal ends of the end covers 22a, 22b closely contact the housing 110 is set to T=50[° C.]. In such a case, equation (1) may be used to calculate that the end covers 22a, 22b have distal end outside diameters of H1=179.947 [mm]. By utilizing equation (1), the distal end outside diameters H1 of the end covers 22a, 22b are easily found. Therefore, it is possible to produce suitable shapes of end covers 22a, 22b.

Further, to ease the stress which is applied to the coil 12 of the stator 100 when the end covers 22a, 22b and the mold resin 14 expand and contract, the end covers 22a, 22b and the mold resin 14 preferably have coefficients of linear expansion which are close to each other. Further, for similar reasons, the end covers 22a, 22b and the mold resin 14 are required to have coefficients of linear expansion which are larger than the coefficient of linear expansion of the material of the stator core 10 and coefficient of linear expansion of the housing.

Figure 2B:
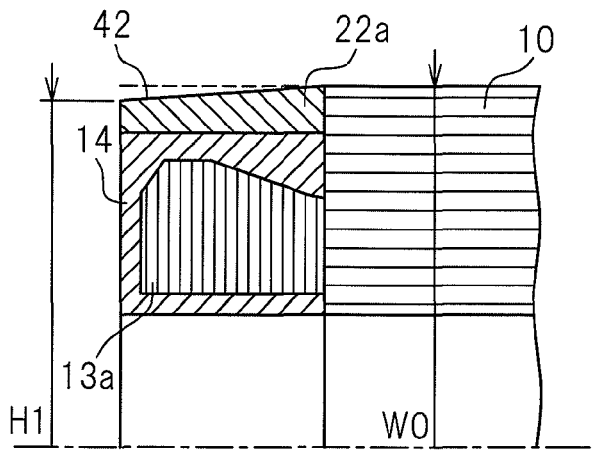
FIG. 2B is a second enlarged view of a coil end part.

FIG. 2B is a second enlarged view of a coil end part. In FIG. 2B, the end covers 22a, 22b have slanted parts 42 which are formed at the outer circumferential surfaces of the end covers 22a, 22b and which extend from the proximal ends to the distal ends. As can be seen from FIG. 2B, the slanted parts 42 are formed so as to taper from the proximal ends toward the distal ends. Further, the slanted parts 42 are formed so that the distal ends of the end covers 22a, 22b, which are also the distal ends of the slanted parts 42, have outside diameters the same as the above-mentioned distal end outside diameters H1. In this case, compared with the cutaway parts 41 which are shown in FIG. 2A, it is possible to more easily form the slanted parts 42.

Figure 3A:
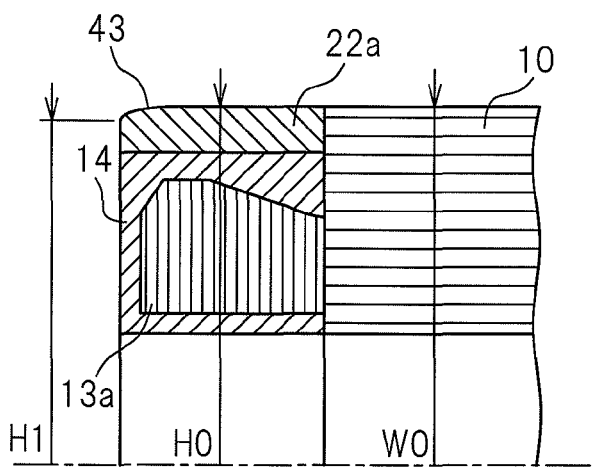
FIG. 3A is a third enlarged view of a coil end part.
Figure 3B:
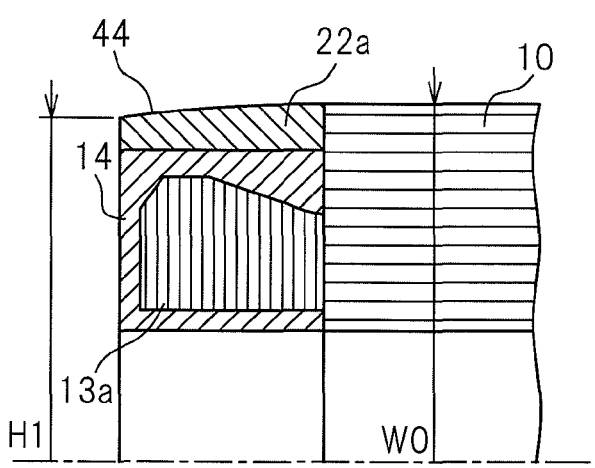
FIG. 3B is a fourth enlarged view of a coil end part.

FIG. 3A is a third enlarged view of a coil end part. In FIG. 3A, the end covers 22a, 22b have distal ends at the outside edges of which the curved parts 43 are formed. As can be seen from FIG. 3A, the curved parts 43 are formed so as to taper toward the distal ends of the end covers 22a, 22b. Further, the curved parts 43 are formed so that the distal ends of the end covers 22a, 22b, which are also the distal ends of the curved parts 43, have outside diameters the same as the above-mentioned distal end outside diameters H1. Note that as shown in the fourth enlarged view of a coil end part of FIG. 3B, the curved parts 44 may be formed so as to extend from the proximal ends to the distal ends of the end covers 22a, 22b. It will be understood that the curved parts 44 can be easily formed compared with the curved parts 43 which are shown in FIG. 3A.

Figure 4A:
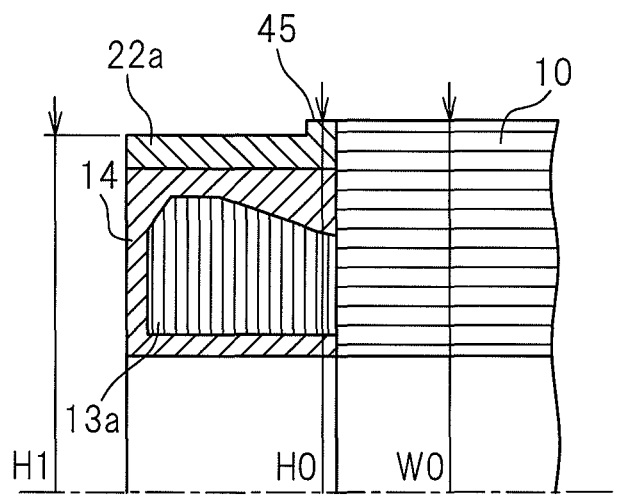
FIG. 4A is a fifth enlarged view of a coil end part.

FIG. 4A is a fifth enlarged view of a coil end part. In FIG. 4A, step parts 45 are formed at the outer circumference near the proximal ends of the end covers 22a, 22b. As can be seen from FIG. 4A, the step parts 45 at the proximal ends of the end covers 22a, 22b have outside diameters H0 which are equal to the diameter W0 of the stator core 10. Further, the step parts 45 at the distal ends of the end covers 22a, 22b have outside diameters which are smaller than the outside diameter W0 of the stator core 10 and which are equal to the above-mentioned distal end outside diameters H1.

Figure 4B:
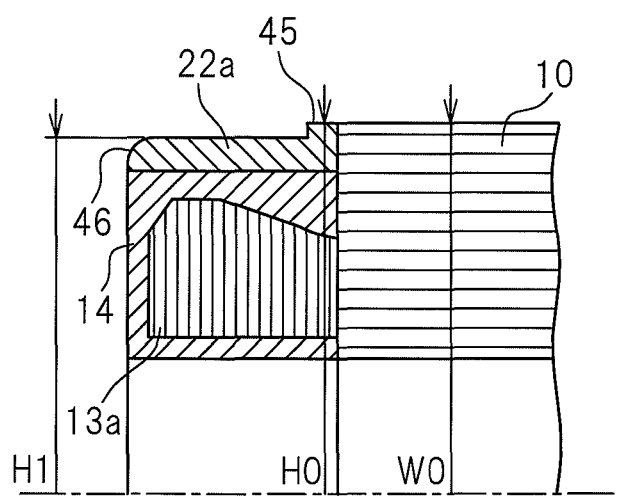
FIG. 4B is a sixth enlarged view of a coil end part.

Furthermore, FIG. 4B is a sixth enlarged view of a coil end part. The end covers 22a, 22b which are shown in FIG. 4B are formed with step parts 45 in the same way as explained above. Further, the end covers 22a, 22b have distal ends with outside edges where curved parts 46 are formed. The curved parts 46 differ from the above-mentioned curved parts 43. The curved parts 46 have outside diameters at the distal ends which are smaller than the above-mentioned distal end outside diameters H1. Note that instead of the curved parts 46, it is also possible to form cutaway parts (not shown). Furthermore, while not shown in the drawings, in FIG. 4A, the entire regions L of the end covers 22a, 22b with outside diameters which correspond to the distal end outside diameters H1 may be formed with slanted parts or curved parts.

In this way, in the embodiments which are shown in FIG. 2B to FIG. 4B as well, it will be understood that similar advantageous effects are obtained as explained with reference to FIG. 2A. Note that the proximal ends have outside diameters which are equal to the outside diameter W0 of the stator core 10 and the distal ends have outside diameters which correspond to the distal end outside diameters H1. All shapes of end covers 22a, 22b are included in the scope of the present invention.

Advantageous Effects of Invention

In the present invention, when inserting the stator in the housing, fine clearances can be formed between the covers and the housing. Therefore, due to the presence of the clearances, the covers can be kept from rising in temperature. For this reason, it is possible to prevent the covers from being tightly fit against the housing in the middle of shrink fitting.

Furthermore, at the time of operation of the electric motor, if the housing reaches a certain temperature, the covers will expand due to the heat and the covers will become equal in outside diameters with the outside diameter of the stator core. Thus, the cover is in close contact with the inner surface of the housing and it is possible to improve a heat conduction efficiency.

Typical embodiments were used to explain the present invention, but a person skilled in the art would understand that the above-mentioned changes and various other changes, deletions, and additions may be made without departing from the scope of the present invention.

The invention claimed is:

1. A stator of an electric motor comprising:
   a coil,
   a stator core which supports said coil, and
   covers which are attached to said stator core so as to surround coil ends of said coil which stick out from end faces of the stator core in the axial direction, wherein
   said covers have outside diameters which are at least partially smaller than an outside diameter of said stator core,
   said covers have coefficients of linear expansion which are larger than a coefficient of linear expansion of said stator core, and
   said covers expand by heat whereby said covers are made to closely contact a housing to be arranged around said stator.

2. The stator according to claim 1 wherein cutaway parts are formed at outside edge parts of distal ends of said covers.

3. The stator according to claim 1 wherein slanted parts which extend from proximal ends to distal ends of said covers are formed at outer surfaces of said covers.

4. The stator according to claim 1 wherein curved parts are formed at outside edge parts of distal ends of said covers.

5. The stator according to claim 1 wherein curved parts which extend from proximal ends to distal ends of said covers are formed at outer surfaces of said covers.

6. The stator according to claim 1 wherein outer surfaces of said covers are formed with step parts and said step parts have outside diameters which are equal to the outside diameter of said stator core at proximal ends of said covers and which are smaller than the outside diameter of said stator core at distal ends of said covers.

7. The stator according to claim 6 wherein outside edge parts of distal ends of said covers are formed with cutaway parts or curved parts.

8. A stator of an electric motor comprising:
   a coil,
   a stator core which supports said coil, and
   covers which are attached to said stator core so as to surround coil ends of said coil which stick out from end faces of the stator core in the axial direction, wherein
   said covers have outside diameters which are at least partially smaller than an outside diameter of said stator core,
   said covers have coefficients of linear expansion which are larger than a coefficient of linear expansion of said stator core, and
   said covers expand by heat at the time of operation of the electric motor so that the covers have outside diameters at the distal ends which are equal to the outside diameter of the stator core.

9. The stator according to claim 8 wherein cutaway parts are formed at outside edge parts of distal ends of said covers.

10. The stator according to claim 8 wherein slanted parts which extend from proximal ends to distal ends of said covers are formed at outer surfaces of said covers.

11. The stator according to claim 8 wherein curved parts are formed at outside edge parts of distal ends of said covers.

12. The stator according to claim 8 wherein curved parts which extend from proximal ends to distal ends of said covers are formed at outer surfaces of said covers.

13. The stator according to claim 8 wherein outer surfaces of said covers are formed with step parts and said step parts have outside diameters which are equal to the outside diameter of said stator core at proximal ends of said covers and which are smaller than the outside diameter of said stator core at distal ends of said covers.

14. The stator according to claim 13 wherein outside edge parts of distal ends of said covers are formed with cutaway parts or curved parts.

* * * * *